(12) United States Patent
Lawrence (10) Patent No.: US 9,707,985 B2
(45) Date of Patent: Jul. 18, 2017

(54) HANDCART WITH PIVOTING SHELF

(71) Applicant: Pat Lawrence, Watertown, NY (US)

(72) Inventor: Pat Lawrence, Watertown, NY (US)

( * ) Notice: Subject to any disclaimer, the term of this patent is extended or adjusted under 35 U.S.C. 154(b) by 0 days.

(21) Appl. No.: 13/987,401

(22) Filed: Jul. 22, 2013

(65) Prior Publication Data

US 2015/0021870 A1  Jan. 22, 2015

(51) Int. Cl.
*B62B 1/10* (2006.01)
*B62B 1/12* (2006.01)
*B62B 1/18* (2006.01)
*B62B 1/20* (2006.01)
*B62B 5/06* (2006.01)

(52) U.S. Cl.
CPC ............... *B62B 1/12* (2013.01); *B62B 5/06* (2013.01); *B62B 5/067* (2013.01); *B62B 2202/021* (2013.01); *B62B 2205/33* (2013.01)

(58) Field of Classification Search
CPC .... B62B 1/10; B62B 1/12; B62B 1/18; B62B 1/20

USPC .......... 280/47.19, 79.11, 79.2, 47.18, 47.23, 280/47.27

See application file for complete search history.

(56) References Cited

U.S. PATENT DOCUMENTS

| | | | |
|---|---|---|---|
| 6,386,557 B1* | 5/2002 | Weldon | 280/30 |
| 6,929,269 B2* | 8/2005 | Oliver | 280/47.18 |
| 7,819,407 B1* | 10/2010 | Charitun | 280/47.18 |
| 2006/0145437 A1* | 7/2006 | Odgers | 280/47.19 |
| 2010/0181737 A1* | 7/2010 | Reinicke et al. | 280/47.19 |
| 2011/0121528 A1* | 5/2011 | Wyse | 280/47.27 |

* cited by examiner

*Primary Examiner* — Bryan Evans
(74) *Attorney, Agent, or Firm* — Charu Narang, Esq.

(57) ABSTRACT

A handcart comprising a frame, a double handle grip, a load accommodating bottom shelf and a load accommodating top shelf, the top shelf being pivotably secured to the double grip handle, wherein the double grip handle of the handcart includes a U shaped top piece which is secured to the double grip handle by bolts that allow the U shaped piece to pivot or swing to a position parallel to the ground. The pivoting or swinging action of the U shaped top piece is accomplished by way of a spring mechanism fitted onto the double grip handle, thereby allowing the pivotably secured top shelf to accommodate heavy loads.

1 Claim, 9 Drawing Sheets

HANDCART WITH PIVOTING SHELF

CROSS REFERENCE TO RELATED APPLICATION

This application is claiming priority to the provisional application 61/741,574 accorded a filing date of Jul. 24, 2012.

BACKGROUND OF THE INVENTION

Field of the Invention

The invention of the present application provides a device and method for added ease in loading and unloading items from a conventional double handle grip handcart. Specifically, the handcart of the present invention includes a pivoting top shelf which may be pulled down to accommodate a crate or items in a tray, such that the user does not have to repeatedly bend over to load and unload the handcart.

Description of the Prior Art

U.S. Pat. Nos. D480,527 and D404,877 disclose a handcart with a top shelf. However, the top shelves of those patents are stationary, not pivotable.

U.S. Pat. No. 4,179,132 discloses a handcart with a top loop like shelf that is used to maintain trash bags in an open position. In the '132 invention, the loop is hinged and may be moved so that it does not obstruct placement of the garbage can. However, unlike the present invention, the shelf of '132 is not sturdy enough to accommodate a heavy load.

U.S. Pat. No. 7,445,216 B1 discloses a handcart with a top tray. However, similar to the '132 patent, the top shelf of the '216 patent is not sturdy enough to accommodate a heavy load.

U.S. Pat. No. 6,722,672 discloses a shelf like structure that is hinged at or near the top of the handcart. However, the purpose of the shelf in the '672 patent is to contain the debris that is in the bin underneath the shelf and, further, it is not sturdy enough to accommodate a heavy load.

US Application No. 2012/0074665 discloses a handcart with a retaining bar for stabilizing load. However, the invention of that application is not a shelf and cannot accommodate a heavy load.

As can be seen, there exist in the marketplace handcarts which have a top shelf to accommodate various items. However, there does not exist in the marketplace a handcart such as the one of the present invention, wherein there is a pivoting top shelf that may be pulled down at will by the user and is able to accommodate a heavy load, such as a crate full of bottles. Furthermore, the pivoting top shelf of the present invention may be retroactively fitted onto existing traditional handcarts with ease and a minimum amount of work.

SUMMARY OF THE INVENTION

In accordance with the present invention, there is provided a handcart comprising a frame, a double handle grip, a load accommodating bottom shelf and a load accommodating top shelf that is pivotably secured to the double grip handle.

The primary objective of the present invention is to provide a handcart with a pivoting top shelf that can accommodate heavy loads.

It is another objective of the present invention to provide a method for retroactively fitting an existing handcart to have a pivoting top shelf that can accommodate a heavy load.

It is yet another objective of the present invention to provide a handcart with a pivoting top shelf that is easy to use.

It is a further objective of the present invention to provide a handcart which would relieve the street on a user's back by enabling them to bend and twist less to accomplish their tasks of loading and unloading items from the cart.

DETAILED DESCRIPTION OF THE INVENTION

Figure 1:
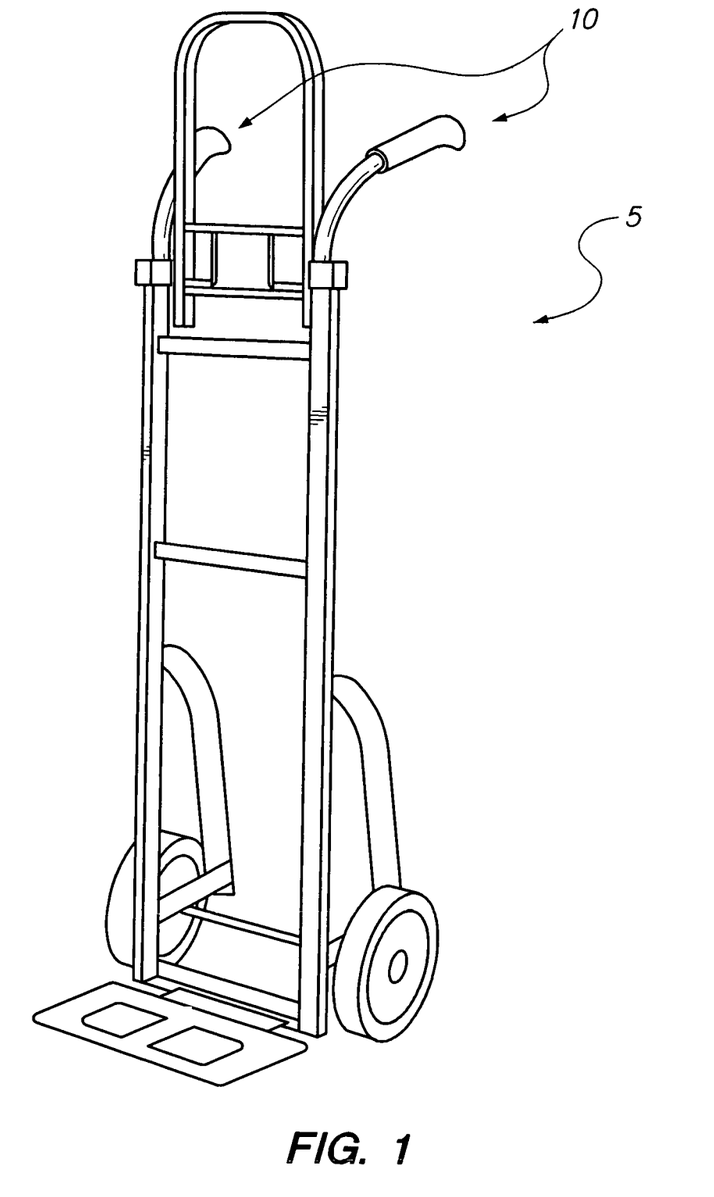
FIG. 1 is a perspective view of a traditional handcart.
Figure 2:
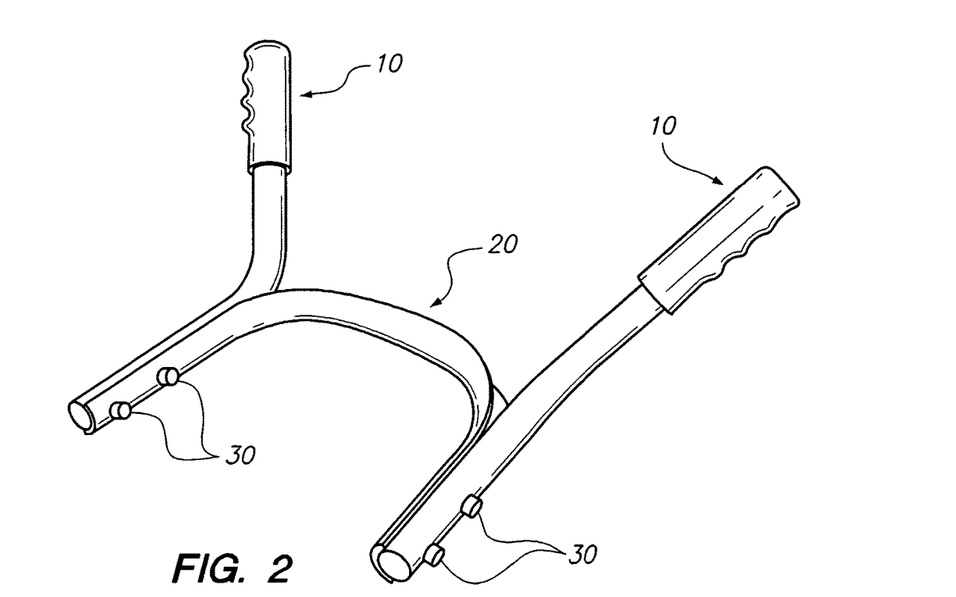
FIG. 2 is a perspective view of the double grip handle of a traditional handcart.
Figure 3:
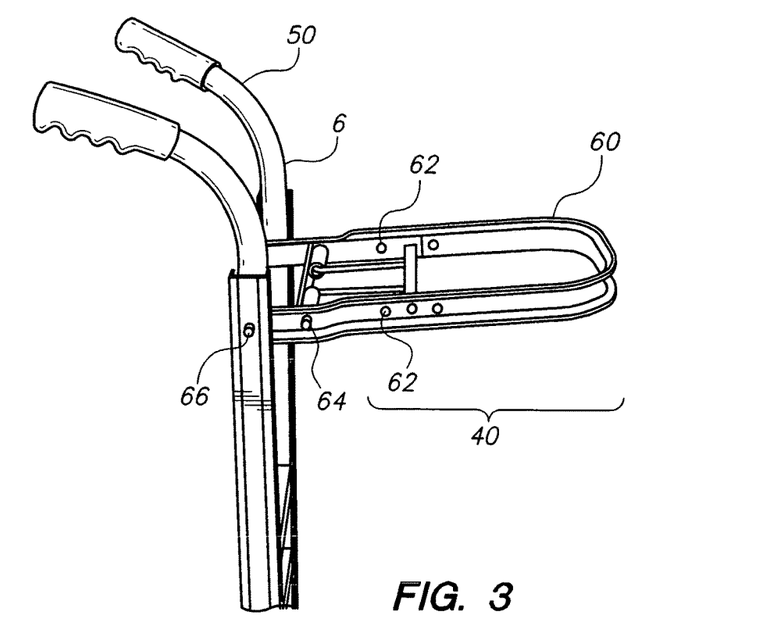
FIG. 3 is a perspective view of the handcart of the present invention with the pivoting shelf in a load accommodating position.
Figure 4:
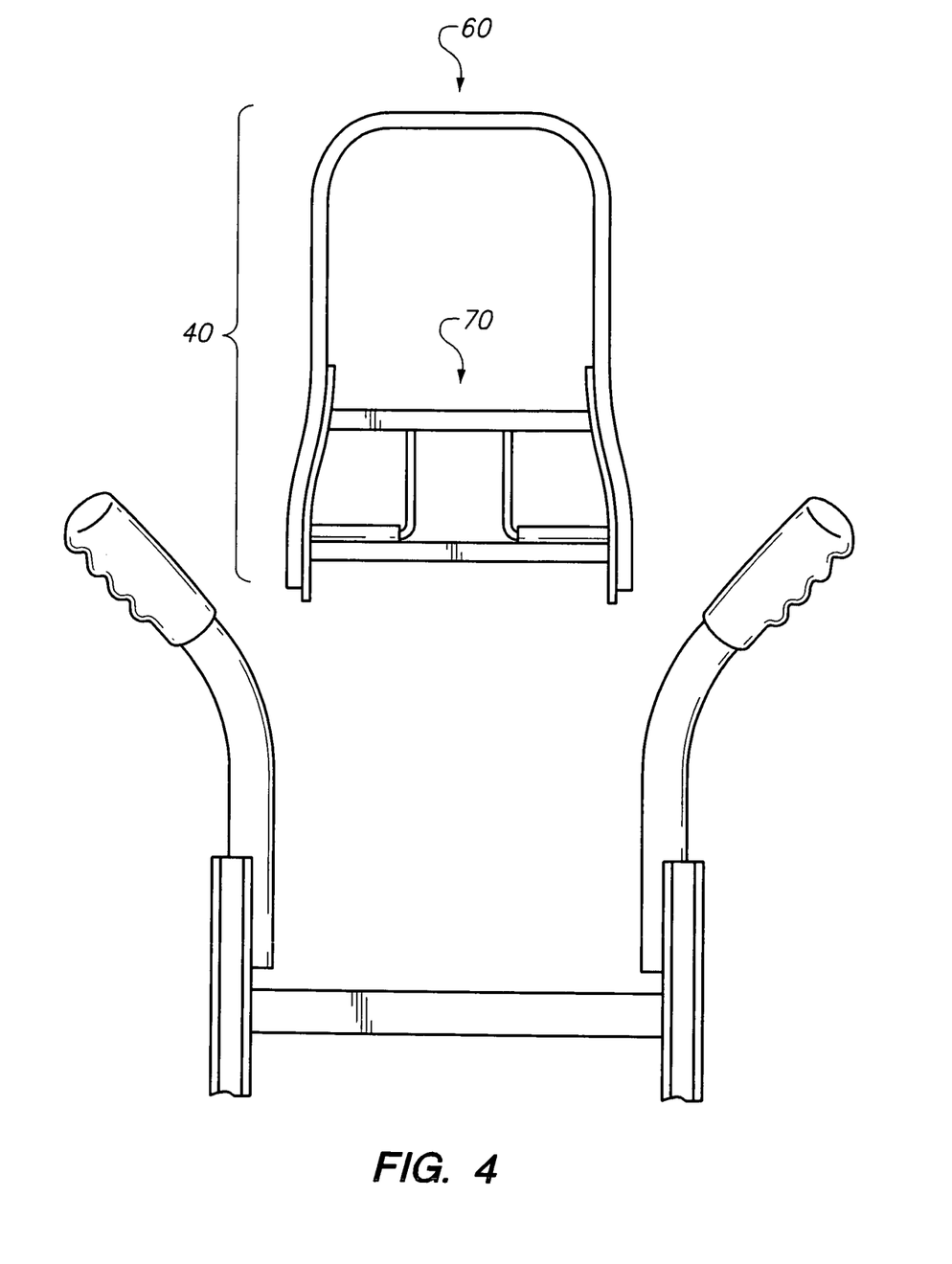
FIG. 4 is an exploded view of the shelf and double grip handle of the handcart of the present invention.
Figure 5:
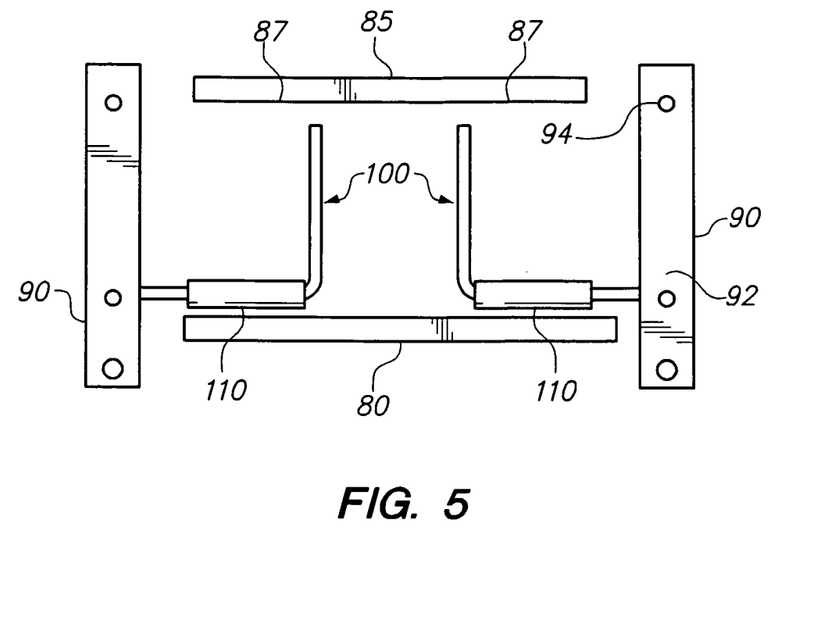
FIG. 5 depicts an exploded view of the pivoting latch mechanism of the handcart of the present invention.
Figure 5A:
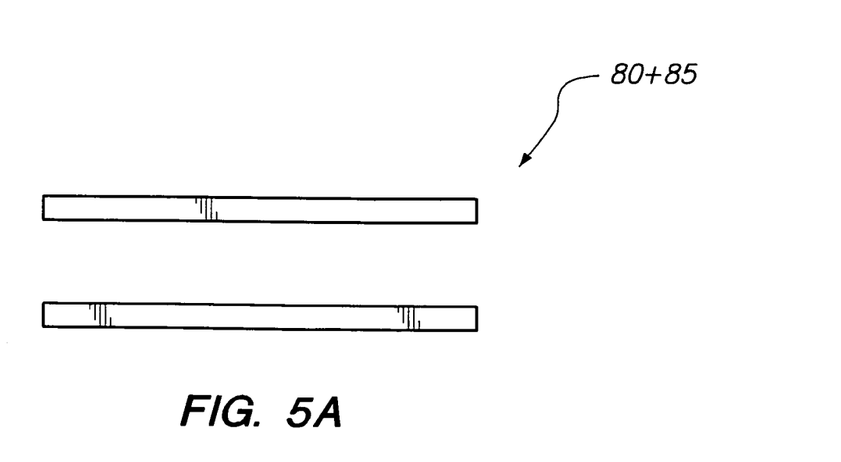
FIG. 5A depicts the square tubing used in the present invention.
Figure 5B:
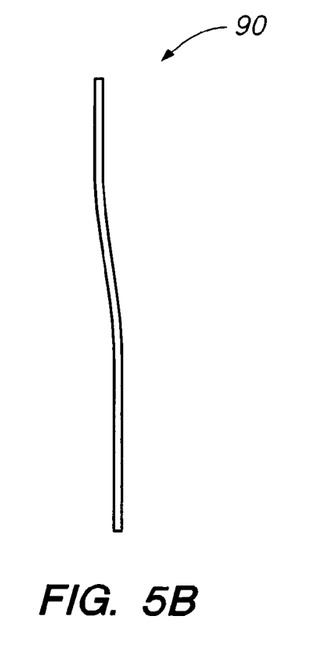
FIG. 5B depicts the curved steel bar used in the present invention.
Figure 5C:
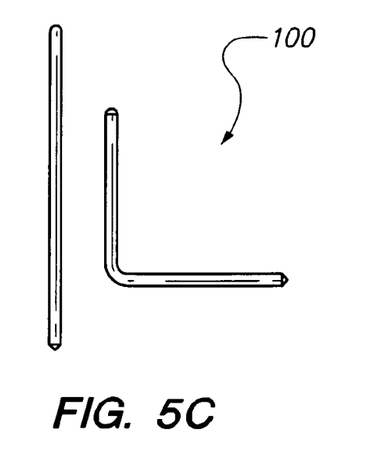
FIG. 5C depicts the L shaped steel rods used in the present invention.
Figure 5D:
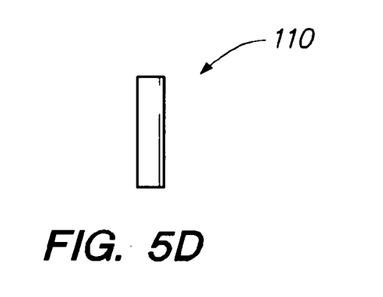
FIG. 5D depicts the round tubes used in the present invention.
Figure 5E:
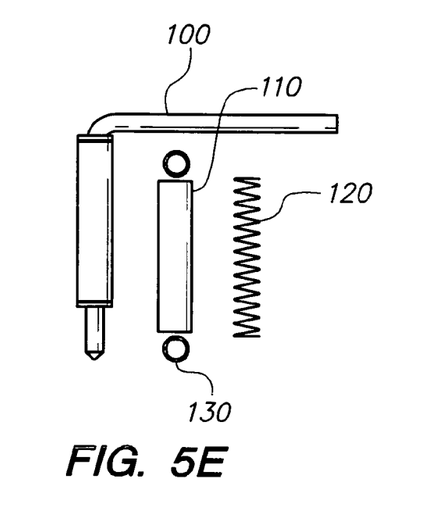
FIG. 5E depicts the spring mechanism used in the present invention.
Figure 6:
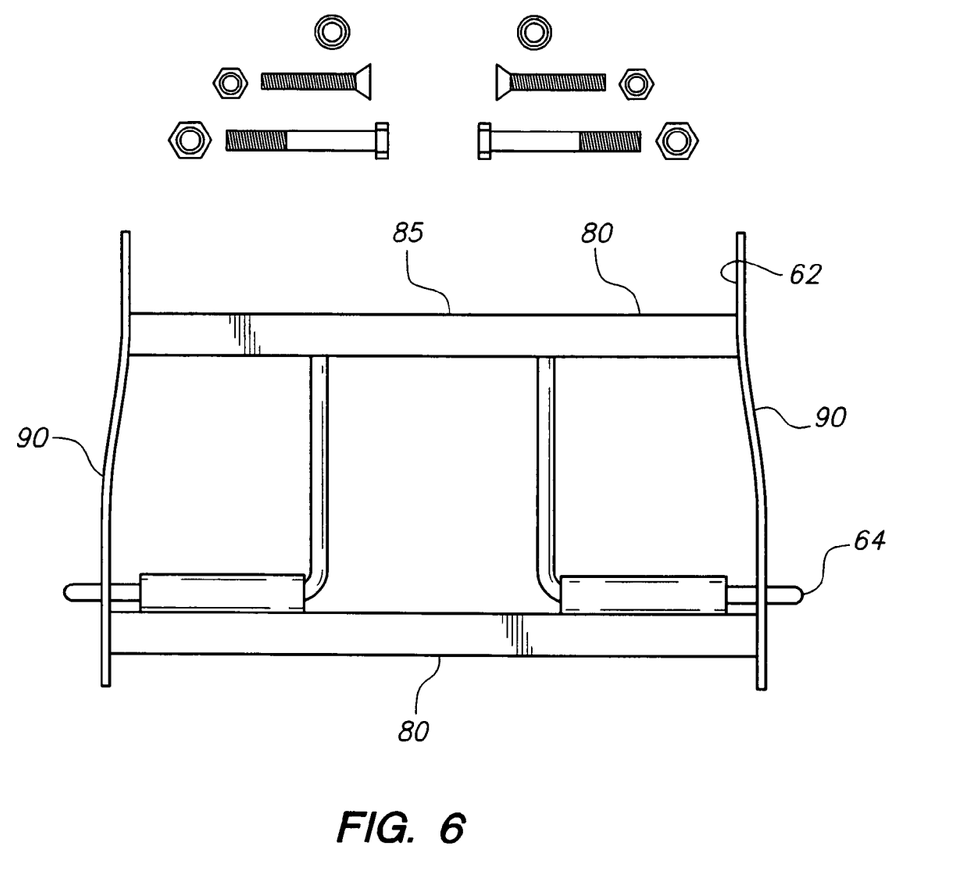
FIG. 6 is a perspective view of the pivoting latch mechanism of the handcart of the present invention.
Figure 7:
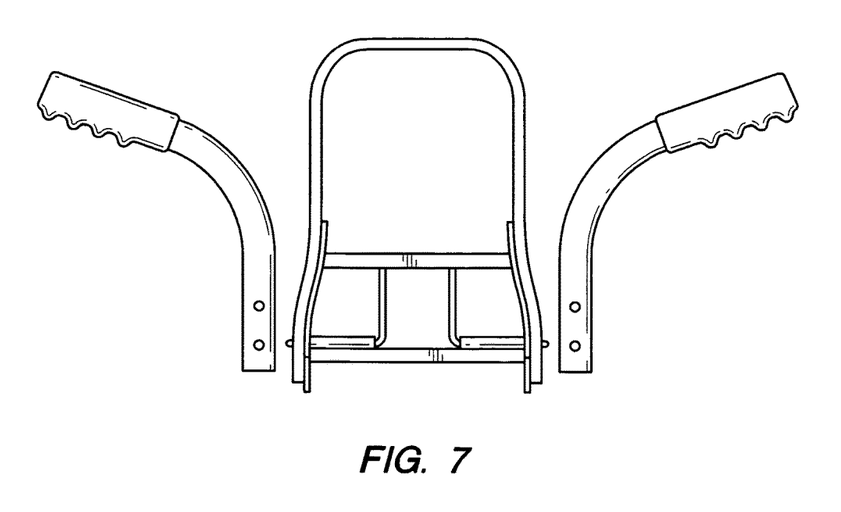
FIG. 7 is a perspective view of the pivoting shelf and double grip handle of the handcart of the present invention.
Figure 8:
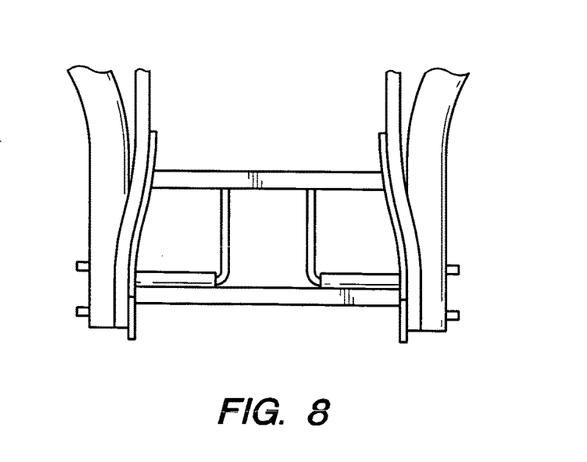
FIG. 8 is a perspective view of the pivoting shelf and double grip handle of the handcart of the present invention.
Figure 9:
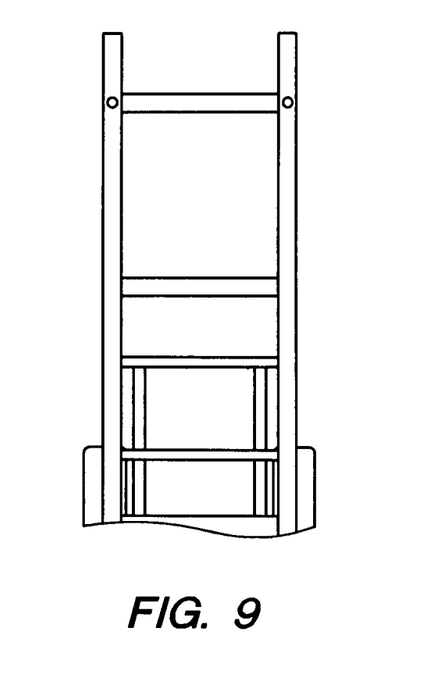
FIG. 9 is a perspective view of the body of the handcart of the present invention.
Figure 10:
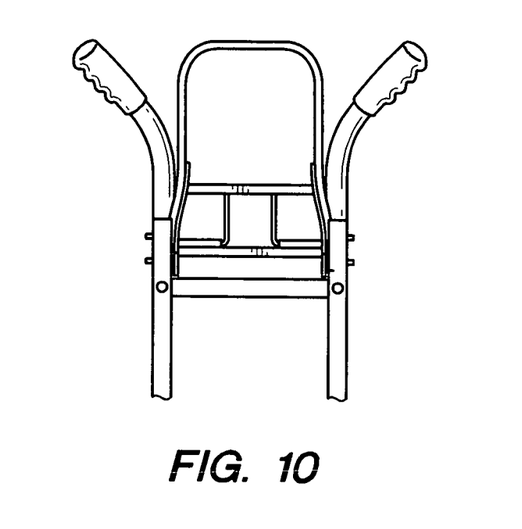
FIG. 10 is a perspective view of the handcart of the present invention with the pivoting shelf in an upright position.

The present invention is directed to a handcart with a pivoting top shelf that is able to accommodate a heavy load. Attached hereto as FIG. 1, is a perspective view of a traditional double grip handcart 5. As can be seen in FIG. 1, the double grip handle 10 of the handcart 5 includes a U shaped top piece 20. Attached hereto as FIG. 2, is a perspective view of the double grip handle 10 portion of the handcart 5. As can be seen with reference to FIG. 2, the U shaped piece 20 is traditionally non-pivotably secured to the double grip handle 10 by way of screws or the like 30. The U shaped piece 20 is traditionally utilized only to accommodate a greater number of crates onto the handcart., As shown in FIG. 3, in the handcart of the present invention 6, there is a shelf 40 that is pivotably secured to the double grip handle 50 of the handcart 6. As can be seen with reference to FIG. 4, the shelf 40 is comprised of a U shaped piece 60 and a pivoting latch assembly 70. The U-shaped piece 60 has securing holes 62 for securing the pivoting latch assembly to the U-shaped piece 60, steel rod accommodating holes 64, and pivoting holes 66. With reference to FIGS. 5 and 5a -5e, the pivoting latch assembly 70 is comprised of one piece of square tubing 80, a second piece of square tubing 85 with receiving spaces 87, two flat, curved steel bars 90, two L shaped steel rods 100, two round tubes 110, two springs 120, and 4 bushings 130. The square tubing 85 has two receiving spaces 87 on one side to accommodate an end of the steel rod 100. Each receiving space 87 has enough lateral dimension to allow for the end of the steel rod 100 to move comfortably within the receiving space 87 when the steel rods 100 are compressed for release and engagement of the pivoting mechanism. The flat, curved steel bars 90 have securing holes 95 for securing the steel bars 90 to the U shaped assembly, steel rod accommodating holes 95, and pivoting holes 97. The holes (62,95), (64,96), and (66,97) are selected so as to be aligned with each other. With reference to FIG. 6, the pivoting latch assembly is integrated into a one piece mechanism, such that the square tubing 85 is connected a wide end 92 of the flat steel bars 90 below the securing holes 62. The steel bars should be positioned such that they form an hourglass shape, with the wide ends 92 facing each other, as depicted in FIG. 6. The square tubing 85 should be positioned such that the receiving space 87 is able to accommodate an end of the steel rods 100 parallel to the steel bars 90. An end of each steel rod 100 is inserted into the receiving space 87. The other end of the steel rod receives, in order, a bushing 130, a round tube 110 containing a spring 120, and another bushing 130. The end of the steel rod 100 with the round tube 110 is welded to the square tubing 80, such that an end of the steel rod 100 fits through the steel rod accommodating holes 96. This may be accomplished by welding or other similar method, that ensures that the pivoting latch assembly 70 has load accommodating and repeated use integrity. The one piece pivoting latch assembly 70 is connected to the U-shaped piece via the securing holes (62, 95) using conventional means. With reference to FIGS. 7 and 8, the U shaped assembly 60 containing the pivoting latch assembly 70 is connected to the double grip handle 50 via the pivoting holes (66,97) using conventional means which would allow a pivoting motion. The double grip handle 50 containing the pivoting shelf is connected to the frame, see FIGS. 9 and 10, of the handcart using conventional means. As can be seen, the screws 30 that are conventionally used to secure the U shaped piece 20 to the double grip handle 10 are replaced to allow the U shaped piece 60 to pivot or swing to a position parallel to the ground. This pivoting or swinging action is accomplished by way of the pivoting latch assembly 70.

Figure 11:
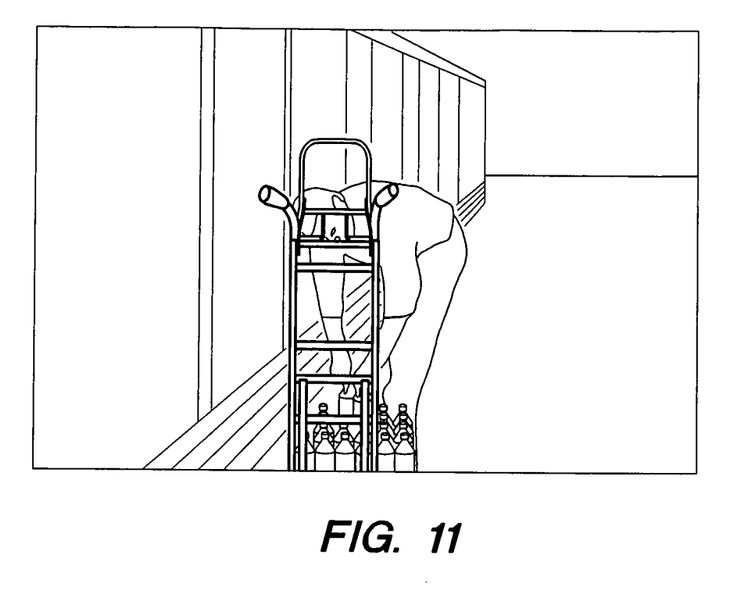
FIG. 11 depicts a user unloading items using a traditional handcart.
Figure 12:
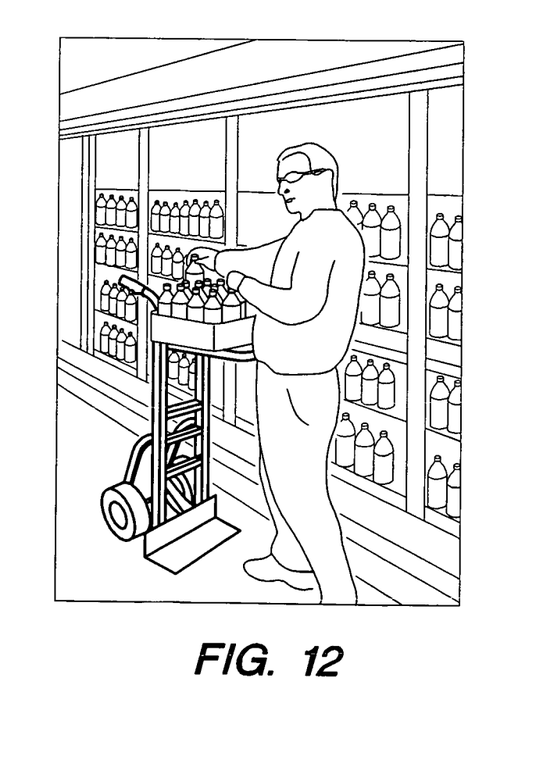
FIG. 12 depicts a user unloading items using the handcart of the present invention.

In use, and as shown in FIGS. 11 and 12, a user grips the steel rods 100 and compresses them to release the U shaped piece 60 to perform as a shelf and into the load accommodating position. As can be seen in FIGS. 11 and 12, in the soft drink or beverage industry, bottles or cans come in cases of 24. Over the last 4 to 5 years, bottled drink manufacturers are selling more single bottles than whole cases. The reasons for this shift include demand and profit, among others. In practice, a soft drink stocker has to stock the shelves at each location by taking single bottles from the case and putting them on the shelf of the refrigeration unit. A soft drink stocker for a major beverage company wheels 6 cases of beverages at a time. When the stocker is at a location to deliver the beverages, there is no bending or twisting to reach the bottles until he gets down to the last 2 or 3 cases. At that point, the stocker usually picks up 3 bottles at a time to stock in the refrigeration unit. The number of times a stocker will bend over to stock 72 bottles is 24 times. On average, a stocker will make 12 to 18 stops a day. Based on these statistics, the average delivery person bends 86,400 times per year to stock beverages. This is based on a 5 day work week, 52 weeks per year. Accordingly, a handcart of the present invention was desired, which would relieve the street on a stocker's back by enabling them to bend and twist less to accomplish the stocking.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

I claim:

1. A handcart comprising:
   a frame, said frame having a gripping end and a non-gripping end,
   wherein said gripping end is comprised of a double handle grip,
   wherein said double handle grip is capable of accommodating a U shaped top piece, wherein the U shaped top piece includes securing holes for securing a pivoting latch assembly to the U-shaped piece,
   wherein the pivoting latch assembly is comprised of two pieces of square tubing situated in parallel fashion to each other and aligned to be perpendicular to the double grip handle, the square tubing having receiving spaces to receive an end of a steel rod containing a spring,
   wherein the pivoting latch assembly is further comprised of two flat curved steel bars which are capable of being attached to each side of the grip handle interior and are also joined perpendicularly to the square tubing, wherein when the spring mechanism is engaged, the U-shaped piece is parallel to sides of the double grip handle and wherein when the spring mechanism is disengaged, the U-shaped piece is able to pivot to a position perpendicular to sides of the double grip handle.

* * * * *